(12) United States Patent
Ling et al.

(10) Patent No.: US 10,726,328 B2
(45) Date of Patent: Jul. 28, 2020

(54) METHOD AND APPARATUS FOR DESIGNING AND IMPLEMENTING A CONVOLUTION NEURAL NET ACCELERATOR

(71) Applicant: Altera Corporation, San Jose, CA (US)

(72) Inventors: Andrew Chaang Ling, Toronto (CA); Gordon Raymond Chiu, North York (CA); Utku Aydonat, Toronto (CA)

(73) Assignee: Altera Corporation, San Jose, CA (US)

( * ) Notice: Subject to any disclaimer, the term of this patent is extended or adjusted under 35 U.S.C. 154(b) by 1328 days.

(21) Appl. No.: 14/879,928

(22) Filed: Oct. 9, 2015

(65) Prior Publication Data

US 2017/0103298 A1 Apr. 13, 2017

(51) Int. Cl.
*G06N 3/063* (2006.01)
*G06N 3/04* (2006.01)

(52) U.S. Cl.
CPC .......... *G06N 3/063* (2013.01); *G06N 3/0454* (2013.01)

(58) Field of Classification Search
CPC ....... G06N 3/063; G06N 3/0454; Y04S 10/54
See application file for complete search history.

(56) References Cited

U.S. PATENT DOCUMENTS

| 2011/0029471 | A1* | 2/2011 | Chakradhar | ........... | G06N 3/063 |
| | | | | | 706/25 |
| 2015/0170021 | A1 | 6/2015 | Lupon et al. | | |
| 2016/0350645 | A1 | 12/2016 | Brothers et al. | | |

OTHER PUBLICATIONS

Peemen et al., "Memory-Centric Accelerator Design for Convolutional Neural Networks", Oct. 6-9, 2013, 2013 IEEE 31st International Conference on Computer Design (ICCD), pp. 13-19 (Year: 2013).*

Ye et al., "Evaluating Two-Stream CNN for Video Classification", Jun. 23-26, 2015, ICMR '15 Proceedings of the 5th ACM on International Conference on Multimedia Retrieval, pp. 1-8 (Year: 2015).*

Sankaradas et al., "A Massively Parallel Coprocessor for Convolutional Neural Networks", Jul. 7-9, 2009, 2009 20th IEEE International Conference on Application-specific Systems, Architectures and Processors, pp. 53-60 (Year: 2009).*

Nagy et al., "Configurable Multilayer CNN-UM Emulator on FPGA", Jul. 9, 2003, IEEE Transactions on Circuits and Systems I: Fundamental Theory and Applications, vol. 50, Issue 6, pp. 774-778 (Year: 2003).*

Chakradhar et al., "A Dynamically Configurable Coprocessor for Convolutional Neural Networks", Jun. 2010, ISCA '10: Proceedings of the 37th annual international symposium on Computer architecture, pp. 247-257 (Year: 2010).*

Zhang, et al.; "Optimizing FPGA-based Accelerator Design for Deep Convolutional Neural Networks"; FPGA'15, Feb. 22-24, 2015, Monterey, California, USA—10 pages.

(Continued)

*Primary Examiner* — Robert A Cassity
*Assistant Examiner* — Brent Johnston Hoover

(57) ABSTRACT

A method for implementing a convolutional neural network (CNN) accelerator on a target includes identifying characteristics and parameters for the CNN accelerator. Resources on the target are identified. A design for the CNN accelerator is generated in response to the characteristics and parameters of the CNN accelerator and the resources on the target.

19 Claims, 12 Drawing Sheets

(56) References Cited

OTHER PUBLICATIONS

Ovtcharov, et al,; "Accelerating Deep Convolutional Neural Networks Using Specialized Hardware", Microsoft Research, Feb. 22, 2015; http://research.microsoft.com/apps/pubs/?id=240715; 4 pages.
Krizhevsky, et al.; "ImageNet Classification with Deep Convolutional Neural Networks"; Advances in Neural Information Processing Systems 25; 2012; pp. 1106-1114.
Dong Chao, et al, "Accelerating the Super-Resolution Convolutional Neural Network" Sep. 17, 2016 (Sep. 17, 2016), ECCV 2016 Conference, Springer International Publishing, pp. 391-407.
Extended European Search Report for Patent Application No. 174204533.8, dated May 4, 2018, 12 pages.
Jefkine Kafunah, "Backpropagation in Convolutional Neural Networks" DeepGrid—Organic Deep Learning, Nov. 29, 2016 (Nov. 29, 2016), pp. 1-10, retrieved from the internet, URL:http://www.jefkine.com/general/2016/09/05/backpropagation-in-convolutional-neural-networks/.
Jonathan Long, et al, "Fully convolutional networks for semantic segmentation" 2015 IEEE Conference on Computer Vision and Pattern Recognition (CVPR), vol. abs/1411.4038v2, Mar. 8, 2015 (Mar. 8, 2015), pp. 1-10.
Kalin Ovtcharov, et al, Accelerating deep convolutional neural networks using specialized hardware Microsoft White Paper, Feb. 22, 2015 (Feb. 22, 2015) pages, retrieved from the internet, URL:https://www.microsoft.com/en-us/research/wp-content/uploads/2016/02/CNN20Whitepaper.pdf, p. 1-p. 4.
Vincent Dumoulin, et al, "A guide to convolution arithmetic for deep learning" ARXIV ORG, Cornell University Library, 201 Olin Librray Cornell Univeristy Ithaca, NY 14853, Mar. 23, 2016 (Mar. 23, 2016).
Zhang Chen et al, Caffeine: Towards uniformed representation and acceleration for deep convolutional neural networks 2016 IEEE/ACM International Conference on Computer-Aided Design (ICCAD), ACM, Nov. 7, 2016 (Nov. 7, 2016), pp. 1-8.
Office Action for U.S. Appl. No. 15/017,597, dated Jul. 5, 2018, 31 pages.
Du, et al, "ShiDianNao", Proceedings of the 42nd Annual Int'l Symposium on Computer Architecture, Jun. 13, 2015, pp. 92-104, NY, NY, USA.
Extended European Search Report for Patent Application No. EP16192364, dated May 7, 2017.
Gokhale, et al "A 240 G-ops/s Mobile Coprocessor for Deep Neural Networks", Computer Vision Foundation CVPR2014 Workshop, 6 pages.
Peemen et al, "Memory-centric Accelerator Design for Convolutional Neural Networks", 2013 IEEE 31st International Conference on Computer Design (ICCD), 2013, pp. 13-19.

\* cited by examiner

METHOD AND APPARATUS FOR DESIGNING AND IMPLEMENTING A CONVOLUTION NEURAL NET ACCELERATOR

FIELD

Embodiments of the present invention relate to tools for designing systems on target devices. More specifically, embodiments of the present invention relate to a method and apparatus for designing and implementing a convolutional neural network accelerator on target devices.

BACKGROUND

As images and videos have become more ubiquitous on the Internet, the need arises for algorithms with the capability to efficiently analyze their semantic content for various applications, including search and summarization. Convolutional neural networks (CNNs) have been shown to be effective tools for performing image recognition, detection, and retrieval. CNNs may be scaled up and configured to support large labeled datasets that are required for the learning process. Under these conditions, CNNs have been found to be successful in learning complex and robust image features.

A CNN is a type of feed-forward artificial neural network where individual neurons are tiled in a manner such that they respond to overlapping regions in a visual field. CNNs are inspired by the behavior of optic nerves in living creatures. CNNs process data with multiple layers of neuron connections to achieve high accuracy in image recognition. Developments in multi-layer CNNs have led to improvement in the accuracy of complex recognition tasks such as large-category image classification, automatic speech recognition, as well as other data classification/recognition tasks.

The limitations in computing power of a single processor have led to the exploration of other computing configurations to meet the demands for supporting CNNs. Among the areas of exploration, CNN accelerators which utilize hardware specialization in the form of general purpose computing on graphics processing units (GPGPUs), multi-core processors, field programmable gate arrays (FPGAs), and application specific integrated circuits (ASICs) have been researched.

SUMMARY

According to an embodiment of the present invention, a methodology for designing and implementing a convolutional neural network (CNN) accelerator is disclosed. The methodology utilizes an electronic design automation (EDA) tool that generates a design for the CNN accelerator in response to features of a CNN accelerator which may include characteristics and parameters of the CNN accelerator specified by a user, and available resources on a target selected by the user. The target may include one or more target devices of one or more types. The EDA tool assigns resources on the target to implement the CNN accelerator to achieve high performance. For example, resources on the target are assigned to implement appropriately sized buffers to handle the types and sizes of images to be processed by the CNN accelerator. Resources on the target are also assigned to implement the appropriate types and number of computation units, such as processing elements, to support the type of filters and layers applied by the CNN accelerator. The EDA tool also generates a sequencer unit that is programmed to coordinate the transmission of data to appropriate computation units in order to time multiplex computations on the computation units.

According to an embodiment of the present invention, a range of characteristics may be specified by the user to allow the CNN accelerator to execute a plurality of CNN algorithms. In this embodiment, one or more configurable status registers (CSRs) are implemented to allow a user to configure the target to support specified characteristics required for executing one of the plurality of CNN algorithms at runtime, after the CNN accelerator is programmed on the target. When implemented on an field programmable gate array (FPGA), the CSRs effectively allow runtime configuration of the CNN accelerator. This facilitates an FPGA overlay targeted at CNN applications.

According to an embodiment of the present invention, a method for implementing a CNN accelerator on a target device includes identifying a CNN algorithm to execute on the CNN accelerator. A variation of the CNN accelerator is identified that supports execution of the CNN algorithm. The variation of the CNN may include a specific number or type of convolution layers, pooling layers, filter size, and/or filter coefficient. CSRs on the target device may be set to support the desired variation. When a different CNN algorithm is desired to be executed on the target device, a different variation of the CNN accelerator may be identified that supports the different CNN algorithm. The CSRs on the target device may be set to support the different variation of the CNN accelerator.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, procedures, and programs are shown in block diagram form to avoid obscuring embodiments of the present invention unnecessarily.

Figure 1:
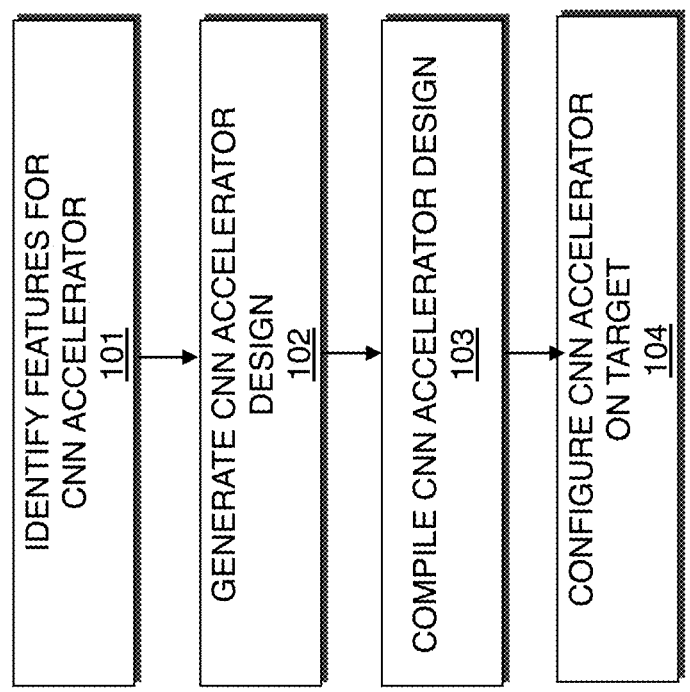
FIG. 1 is a flow chart illustrating a method for designing and implementing a convolutional neural network (CNN) accelerator according to an exemplary embodiment of the present invention.

FIG. 1 is a flow chart illustrating a method for designing and implementing a convolutional neural network (CNN) accelerator according to an exemplary embodiment of the present invention. The procedures described in FIG. 1 may be performed by an electronic design automation (EDA) tool and an CNN accelerator configuration tool on a computer system. The procedures described may also be performed in combination with other tools or systems. At 101, features of a design for the CNN accelerator are identified. According to an embodiment of the present invention, identifying features of the design include identifying characteristics and parameters for the CNN accelerator, and resources available on a target implementing the CNN accelerator. It should be appreciated that when the CNN accelerator is desired to support more than one CNN algorithm, a plurality or range of characteristics and parameters may be identified. According to an embodiment of the present invention, the features of the design for the CNN accelerator may be provided in a high level design language such as OpenCL or other design language.

At 102, a design for the CNN accelerator is generated. According to an embodiment of the present invention, an architecture description of the design for the CNN accelerator is generated in response to the features of the CNN accelerator. The design for the CNN accelerator may be optimized for the target implementing the CNN accelerator. According to an embodiment of the present invention, the design for the CNN accelerator may be generated in a high level design language or a hardware description language.

At 103, the design for the CNN accelerator is compiled for the target. According to an embodiment of the present invention, compilation involves performing synthesis, placement, routing, and timing analysis procedures on a hardware description language of the design. The compiled design for the CNN accelerator supports a range of CNN variants.

At 104, the CNN accelerator is configured on the target. According to an embodiment of the present invention, the target is programmed using the compiled design of the CNN accelerator. The target is further configured to implement a variation of the CNN accelerator to support execution of a desired CNN algorithm. During runtime, further configurations may be applied to implement other variations of the CNN accelerator to support execution of other CNN algorithms.

Figure 2:
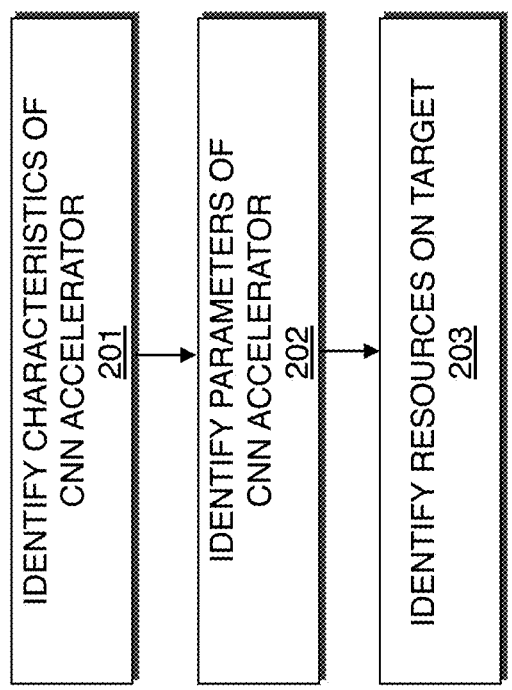
FIG. 2 is a flow chart illustrating a method for identifying features of a CNN accelerator according to an exemplary embodiment of the present invention.

FIG. 2 is a flow chart illustrating a method for identifying design features for a CNN accelerator according to an embodiment of the present invention. The procedures described in FIG. 2 may be used to implement procedure 101 in FIG. 1 and may be performed by an EDA tool executed on a computer system. At 201, characteristics of the CNN accelerator are identified. According to an embodiment of the present invention, identifying the characteristics for the CNN accelerator may include identifying characteristics of one or more CNN algorithms that the CNN accelerator is desired to support. The characteristics of a CNN algorithm may include a number and sequence of stages of layers, such as convolution and noise filtering layers. The noise filtering layers may include, for example, pooling, normalization, and rectified linear (ReLU) layers. The characteristics of the CNN algorithm may also include sizes and coefficients of filters, and sizes, strides, and padding of images to be processed. According to an embodiment of the present invention, a stride of an image corresponds to a number of pixels that may be skipped in an input when performing convolution and may be used to adjust a number of output results. Padding of an image relates to values added to a perimeter of an image and may be used to match input and output images. It should be appreciated that other characteristics may also be identified.

At 202, parameters of the CNN accelerator are identified. According to an embodiment of the present invention, identifying parameters for the CNN accelerator may include identifying parameters for the one or more CNN algorithms that the CNN accelerator is desired to support. The parameters of a CNN algorithm may include a number of kernels to instantiate for each layer identified, and a number of multiplications to execute for each cycle of a kernel. It should be appreciated that other parameters may also be identified.

At 203, resources available on a target to implement the CNN accelerator are identified. According to an embodiment of the present invention the target may include one or more target devices of one or more target device types. The resources identified may include a number and type of memory blocks, digital signal processors (DSPs), and other components and processing units on a target device. According to an embodiment of the present invention, the features of the CNN may be identified from input provided by the user or from other sources.

Figure 3:
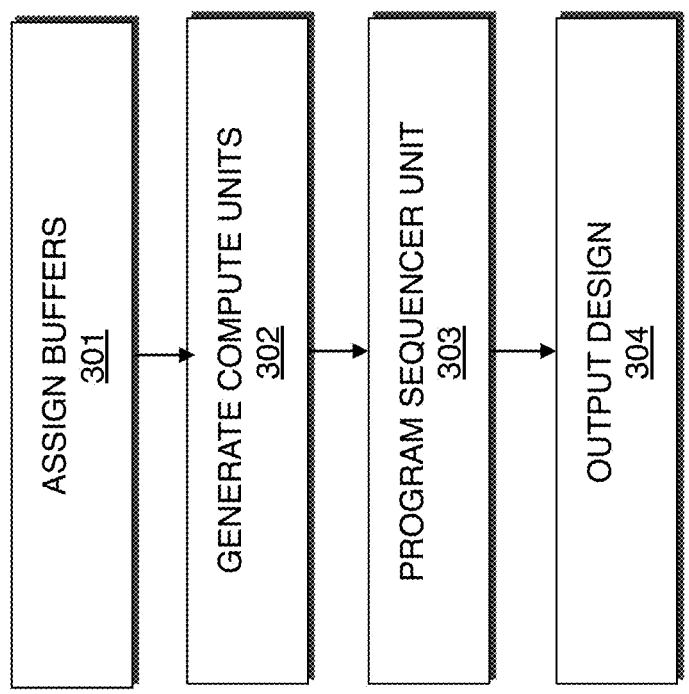
FIG. 3 is a flow chart illustrating a method for generating a design for a CNN accelerator according to an embodiment of the present invention.

FIG. 3 is a flow chart illustrating a method for generating a design for a CNN accelerator according to an embodiment of the present invention. The procedures described in FIG. 3 may be used to implement procedure 102 in FIG. 1 and may be performed by an EDA tool executed on a computer system. At 301, buffers on the CNN accelerator are assigned an appropriate size to support a size of images to be processed by the CNN accelerator. According to an embodiment of the present invention, the design for the CNN accelerator architecture is structured such that there is one read port and one write port for each buffer. This ensures an efficient implementation that does not require arbitration to access data in the buffer. According to one embodiment, double buffering is supported to allow writing of new intermediate results from a convolution stage while reading results from a previous stage in a different location in the buffer.

At 302, computation units are generated to support the CNN algorithms to be performed by the CNN accelerator. According to an embodiment of the present invention, the computation units include kernels that perform convolution and noise filtering. The computation units may be generated to maximum performance utilizing resources available on a target implementing the CNN accelerator. The resources available on the target that may be utilized may include DSP blocks, memory blocks, shift registers, and adders. In one embodiment, dot product computations performed by kernels are organized to leverage vector modes supported by reconfigurable DSP blocks on the target. In another embodiment, pool layers utilize shift register resources available on the target.

At 303, a sequencer unit is generated. The sequencer unit coordinates transmission of data to appropriate processing elements on the CNN accelerator at appropriate times in order to time multiplex computations on the processing elements.

At 304, a description of the design is generated. According to an embodiment of the present invention, the description of the design may be in a hardware description language (HDL) format or other format.

Figure 4:
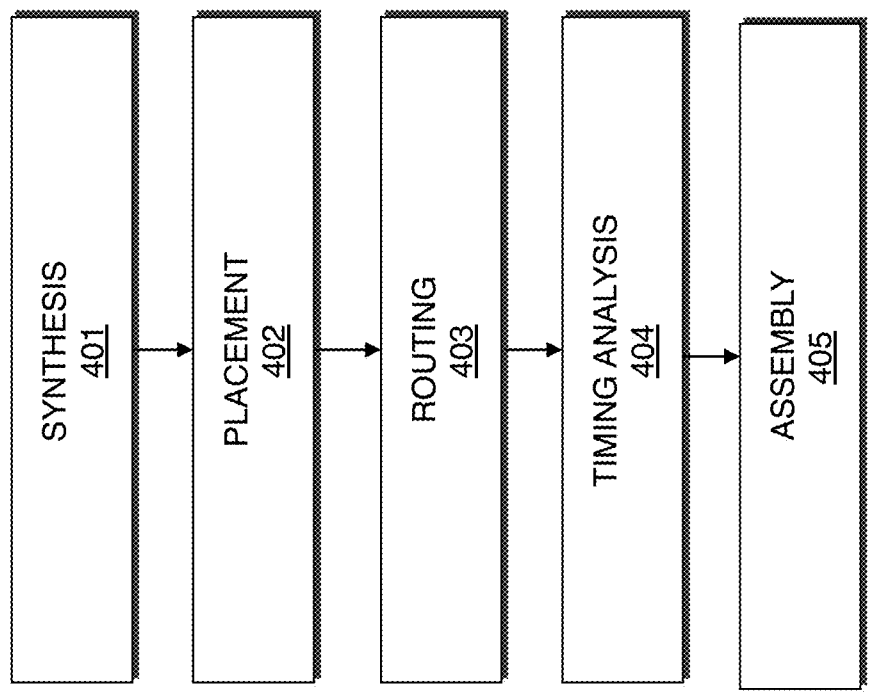
FIG. 4 is a flow chart illustrating a method for compiling a design for a CNN according to an exemplary embodiment of the present invention.

FIG. 4 is a flow chart illustrating a method for compiling a design for a CNN accelerator on a target according to an exemplary embodiment of the present invention. The target may be one or more field programmable gate arrays (FPGAs), application specific integrated circuits (ASICs), structured ASICs, or other programmable device. The procedures described in FIG. 4 are referred to as a compilation flow. The procedures may be used to implement procedure 103 in FIG. 1 and may be performed by an EDA tool executed on a computer system.

At 401, a design for the CNN accelerator is synthesized. Synthesis includes generating a logic design of the system to be implemented by the target. According to an embodiment of the present invention, synthesis generates an optimized logical representation of the system from an HDL design definition. The optimized logical representation of the system may include a representation that has a minimized number of functional blocks, such as logic gates, logic elements, and registers, required for the system. Synthesis also includes mapping the optimized logical representation. Mapping includes determining how to implement logic gates and logic elements in the optimized logic representation with the types or categories of resources available on the target. The resources available on the target may be referred to as "cells" or "components" and may include logic-array blocks, registers, memories, DSP blocks, input-output elements, and other components. According to an embodiment of the present invention, a netlist is generated from mapping. This netlist may be an optimized technology-mapped netlist generated from the HDL.

At 402, the system is placed. According to an embodiment of the present invention, placement involves placing the technology-mapped logical system design on the target. Placement includes fitting the system on the target by determining which specific resources on the target are to be assigned to and implemented by the technology-mapped netlist determined during synthesis. Placement may include clustering which involves grouping logic elements together to form the logic clusters present on the target.

At 403, the placed design is routed. During routing, routing resources on the target are allocated to provide interconnections between logic gates, logic elements, and other components on the target device. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design.

At 404, timing analysis is performed on the design of the system. According to an embodiment of the present invention, the timing analysis determines whether timing constraints of the system are satisfied. According to an embodiment of the present invention, timing analysis establishes a length for each path in the system as well as the slack for each path in the system. Slack may be defined to be the amount of delay that can be added to a path before it becomes critical or required time for signal arrival minus actual time of signal arrival.

At 405, assembly is performed. The assembly procedure involves creating a configuration file that includes information determined by the procedures described at 401-404. The configuration file may be a bit stream that may be used to program the target to implement the CNN accelerator. Programming the target physically transforms programmable resources on the target into the design of the CNN accelerator.

Figure 5:
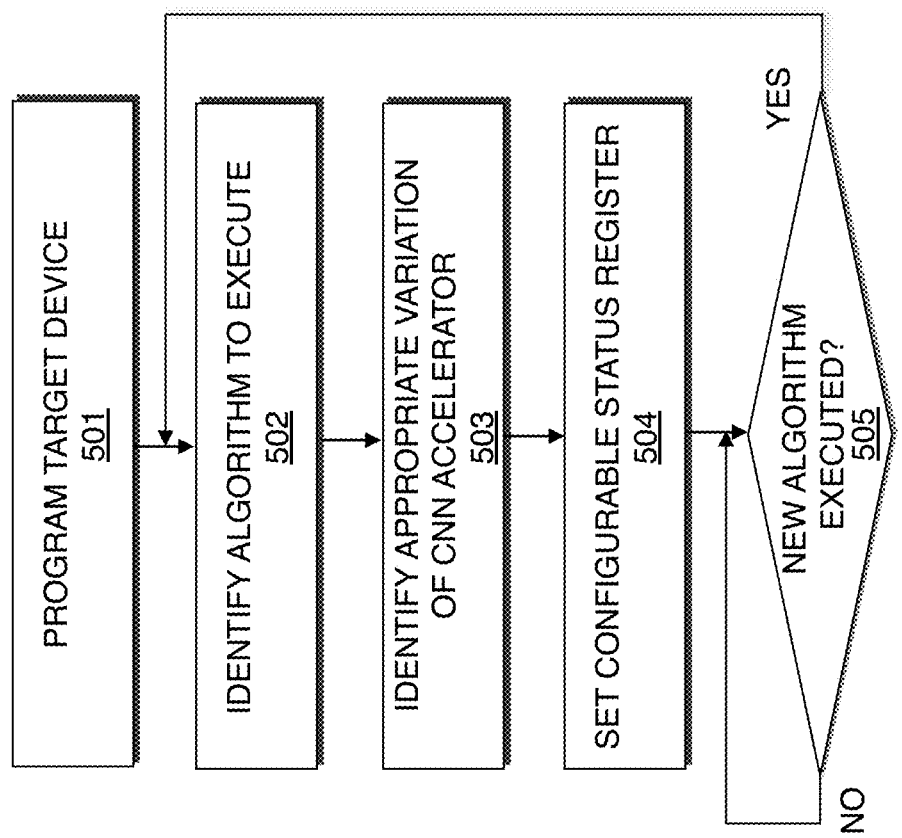
FIG. 5 is a flow chart illustrating a method for configuring a CNN accelerator on a target device according to an exemplary embodiment of the present invention.

FIG. 5 is a flow chart illustrating a method for configuring a CNN accelerator on a target according to an exemplary embodiment of the present invention. The procedures illustrated in FIG. 5 may be used to implement procedure 104 in FIG. 1 and be performed by a CNN accelerator configuration tool on a computer system. At 501, a target is programmed to implement the CNN accelerator. According to an embodiment of the present invention, programming the target involves programming one or more target devices with a configuration file that physically transforms the one or more target devices into the design of the CNN accelerator.

At 502, a CNN algorithm to be executed by the CNN accelerator is identified. According to an embodiment of the present invention, the CNN algorithm to be executed may be identified from user input or from another source.

At 503, an appropriate variation of the CNN accelerator that supports the CNN algorithm to be executed is identified. According to an embodiment of the present invention, the appropriate variation of the CNN accelerator may be identified from user input or from another source.

At 504, one or more configurable status registers are set to support the variation of the CNN accelerator. According to an embodiment of the present invention, setting a configurable status register may add or subtract a convolution layer on the CNN accelerator, set a filter coefficient, remove one or more noise filtering layers, or reduce a size of a filter.

At 505, a determination is made as to whether a new CNN algorithm is to be executed by the CNN accelerator. According to an embodiment of the present invention, the determination may be made in response to user input. If a determination is made that a new CNN algorithm is to be executed by the CNN accelerator, control proceeds to 502. If a determination is made that a new CNN algorithm is not to be executed by the CNN accelerator, control returns to 505.

FIGS. 1-5 are flow charts that illustrate embodiments of the present invention. The procedures described in these figures may be performed by an EDA tool and a CNN accelerator configuration tool implemented by one or more computer systems. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 6:
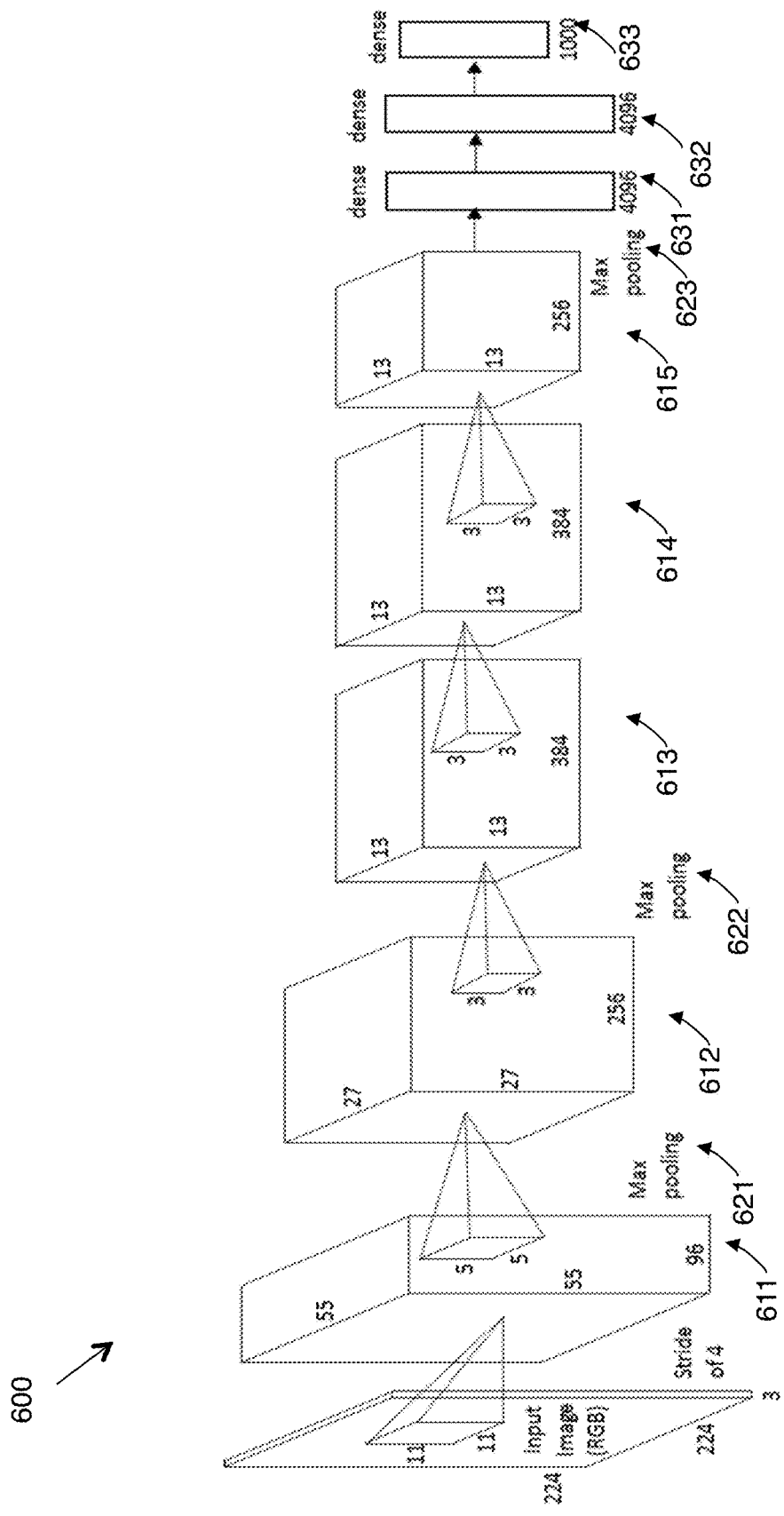
FIG. 6 illustrates an exemplary CNN according to an exemplary embodiment of the present invention.

FIG. 6 illustrates a conceptual view of an exemplary CNN 600 that may be used to implement a CNN algorithm according to an exemplary embodiment of the present invention. The CNN 600 includes a plurality of layers where each layer transforms one volume of activations to another volume through a differentiable function. The CNN 600 includes five convolution layers 611-615. The convolution layer computes an output of neurons that are connected to local regions in an input. The convolution layer computes a dot product between its weights and the region it is connected to in an input volume.

The CNN 600 includes three max-pooling layers 621-623. A pooling layer performs a down-sampling operation along spatial dimensions. Pooling layers reduce variance by computing a maximum or average value of a particular feature over a region of an image. This ensures that a same result will be obtained even when image features have small translation. This operation may be used for object classification and detection.

The CNN 600 includes three fully-connected layers 631-633. The fully-connected layers perform high-level reasoning. The fully-connected layers take all neurons from a previous layer and connect them to every neuron in its layer.

It should be appreciated be appreciated that a CNN may include other layers. For example, one or more ReLU layers may be used to apply an element-wise activation function such as max (0,x). The ReLU layer increases non-linear properties of a decision function and of an overall CNN without affecting the receptive fields of a convolution layer.

Figure 7:
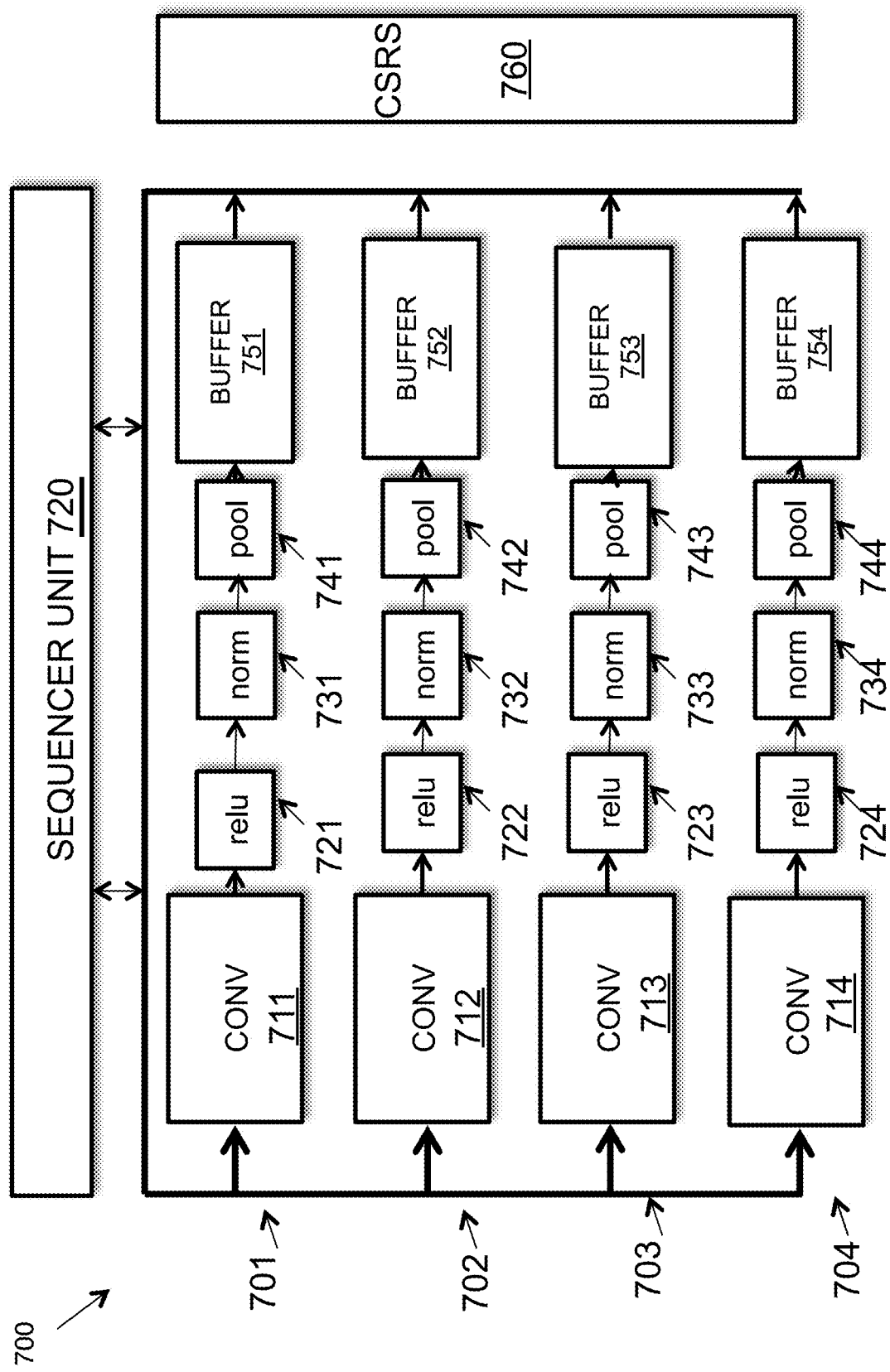
FIG. 7 is a block diagram of a CNN accelerator according to an exemplary embodiment of the present invention.

FIG. 7 is a block diagram of an exemplary CNN accelerator 700 that may be used to implement a CNN according to an embodiment of the present invention. The CNN accelerator 700 allows for efficient computation of forward propagation of convolution and other layers. The CNN accelerator 700 accepts an input image and may apply multiple convolution and other layers in succession.

Input image pixels are transmitted into the processing element (PE) arrays 701-704 which may perform independent dot-product operations in a convolution procedure. PE array 701 represents a first PE array and PE array 704 represents an nth PE array, where n can be scaled to any number. According to an embodiment of the present invention, each PE array includes hardware components that support layers such as a convolution layer, ReLU layer, normalization layer, and pooling layer.

A sequencer unit 720 orchestrates the sequencing, addressing, and delivery of data to each of the PE arrays 701-704. The sequencer unit 720 coordinates the transmission of data to appropriate PE arrays 701-704 in order to time multiplex computations on the PE arrays 701-704. The accumulated results from the PE arrays 701-704 may be transmitted to one of the buffers 751-754 which transmits the computed output layer back to components in the PE arrays 701-704 for a next round of layer computation.

The CNN accelerator 700 includes configurable status registers (CSRs) 760. The CSRs 760 are programmable by a user during runtime to modify various aspects of the CNN accelerator 700. For example, the CSRs 760 may be set to add or subtract a number of convolution layers used by the CNN accelerator 700, change filter coefficients, remove one or more pooling, ReLU, or other layers used by the CNN accelerator 700, and/or reduce a size of a filter supported by the CNN accelerator 700. The CSRs 760 may be coupled to each of the components of the PE arrays 701-704.

According to an embodiment of the present invention, each of the PE arrays 701-704 includes a first kernel 711-714, that supports a convolution layer, a second kernel 721-724, that supports a ReLU layer, a third kernel 731-734, that supports a normalization layer, and a fourth kernel 841-844, that supports a pooling layer. The output of the fourth kernel, 741-744, is transmitted to a buffer 751-754 from where it may be fed back into the first kernel 711-714 for a next convolution stage. According to an embodiment of the present invention, a single kernel may support the normalization layer. In this embodiment, the single normalization kernel would be connected to kernels 721-724 that support the ReLU layer. It should be appreciated that each of the PE arrays 701-704 may support kernels that implement layers other than the ones illustrated in FIG. 7, such as fully-connected layers.

Figure 8:
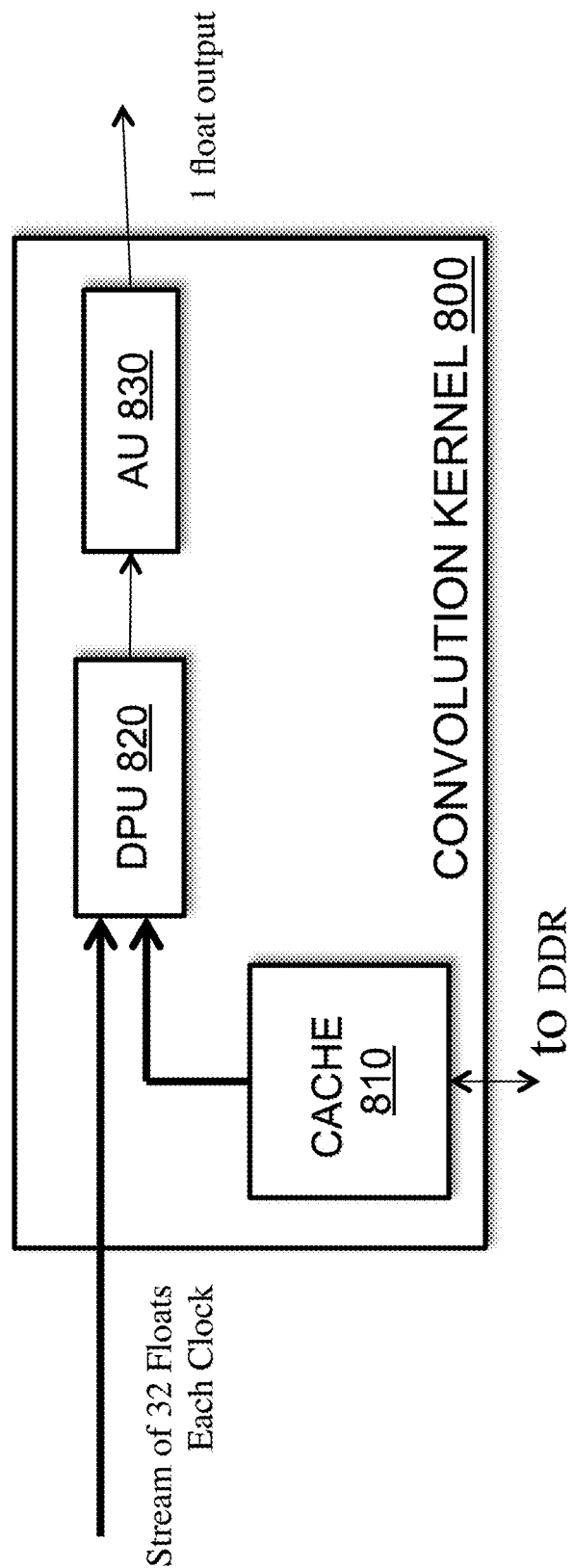
FIG. 8 is a block diagram illustrating a convolution kernel according to an exemplary embodiment of the present invention.

FIG. 8 is a block diagram illustrating an exemplary convolution kernel according to an embodiment of the present invention. The convolution kernel 800 may be used to implement any one of the convolution kernels 711-714 illustrated in FIG. 7. According to an embodiment of the present invention, the convolution kernel 800 includes a cache 810 for storing recycled and repeated filter data. The cache 810 may be implemented using a memory block on a target device. The convolution kernel 800 includes a dot product unit 820 that computes a 32-float dot products every clock cycle. The dot product unit 820 receives streaming, non-repeated data and recycled and repeated sequence data. The dot product unit 820 may be implemented using one or more DSP blocks on the target. The convolution kernel 800 includes an accumulator unit 830. The accumulator unit 830 accumulates dot product results as partial sums until full convolution is completed.

Figure 9:
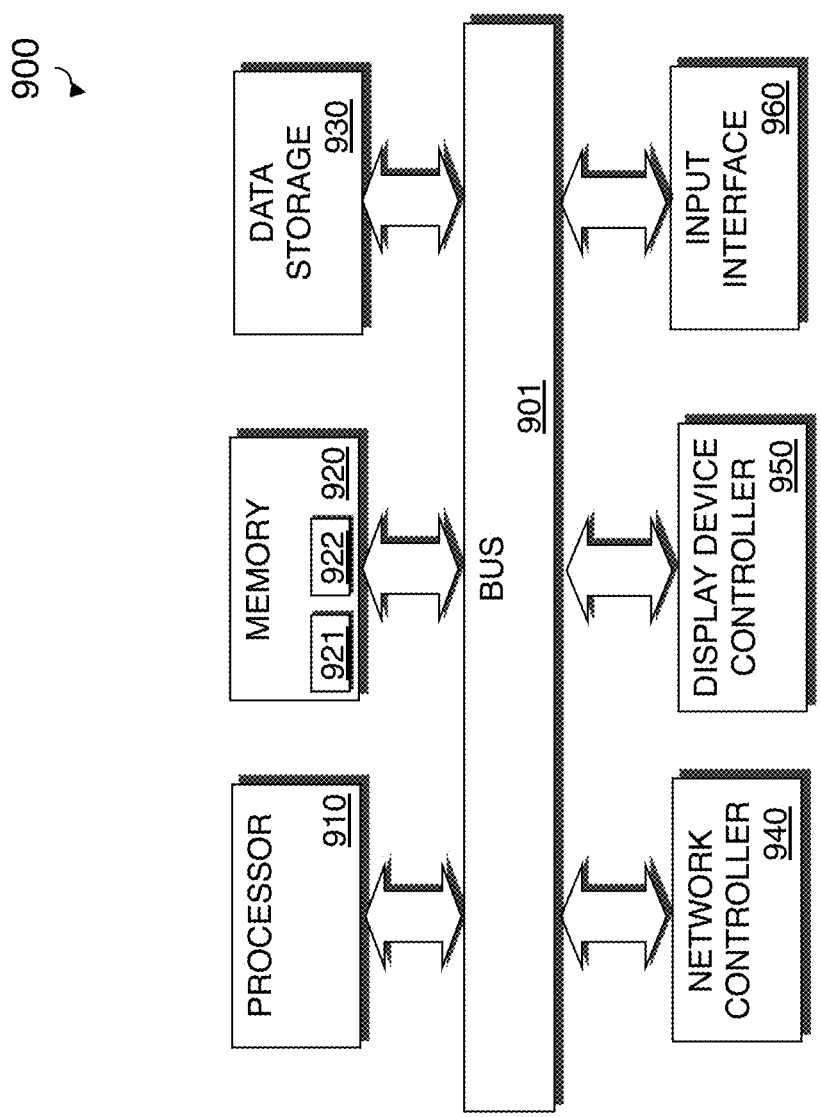
FIG. 9 illustrates a block diagram of a computer system implementing an electronic design automation tool and a CNN accelerator configuration tool according to an exemplary embodiment of the present invention.

FIG. 9 illustrates a block diagram of a computer system 900 implementing a system designer according to an embodiment of the present invention. The computer system 900 includes a processor 910 that process data signals. The processor 910 is coupled to a bus 901 or other switch fabric that transmits data signals between processor 910 and other components in the computer system 900. The computer system 900 includes a memory 920. The memory 920 may store instructions and code represented by data signals that may be executed by the processor 910. A data storage device 930 is also coupled to the bus 901

A network controller 940 is coupled to the bus 901. The network controller 940 may link the computer system 900 to a network of computers (not shown) and supports communication among the machines. A display device controller 950 is coupled to the bus 901. The display device controller 950 allows coupling of a display device (not shown) to the computer system 900 and acts as an interface between the display device and the computer system 900. An input interface 960 is coupled to the bus 901. The input interface 960 allows coupling of an input device (not shown) to the computer system 900 and transmits data signals from the input device to the computer system 900.

An EDA tool 921 may reside in the memory 920 and be executed by the processor 910. According to an embodiment of the present invention, the EDA tool 921 operates to identify features of a CNN accelerator which include characteristics and parameters of the CNN accelerator, and resources of a target that the CNN accelerator is to be implemented on. The EDA tool 921 generates a design for the CNN accelerator in response to the features of the CNN accelerator and the resources of the target.

A CNN accelerator configuration tool 922 may reside in the memory 920 and be executed by the processor 910. According to an embodiment of the present invention, the CNN accelerator configuration tool 922 identifies a CNN algorithm to execute on a CNN accelerator, identifies a variation of the CNN accelerator that supports execution of the CNN algorithm, and sets configurable status registers on a target to support the variation of the CNN accelerator.

Figure 10:
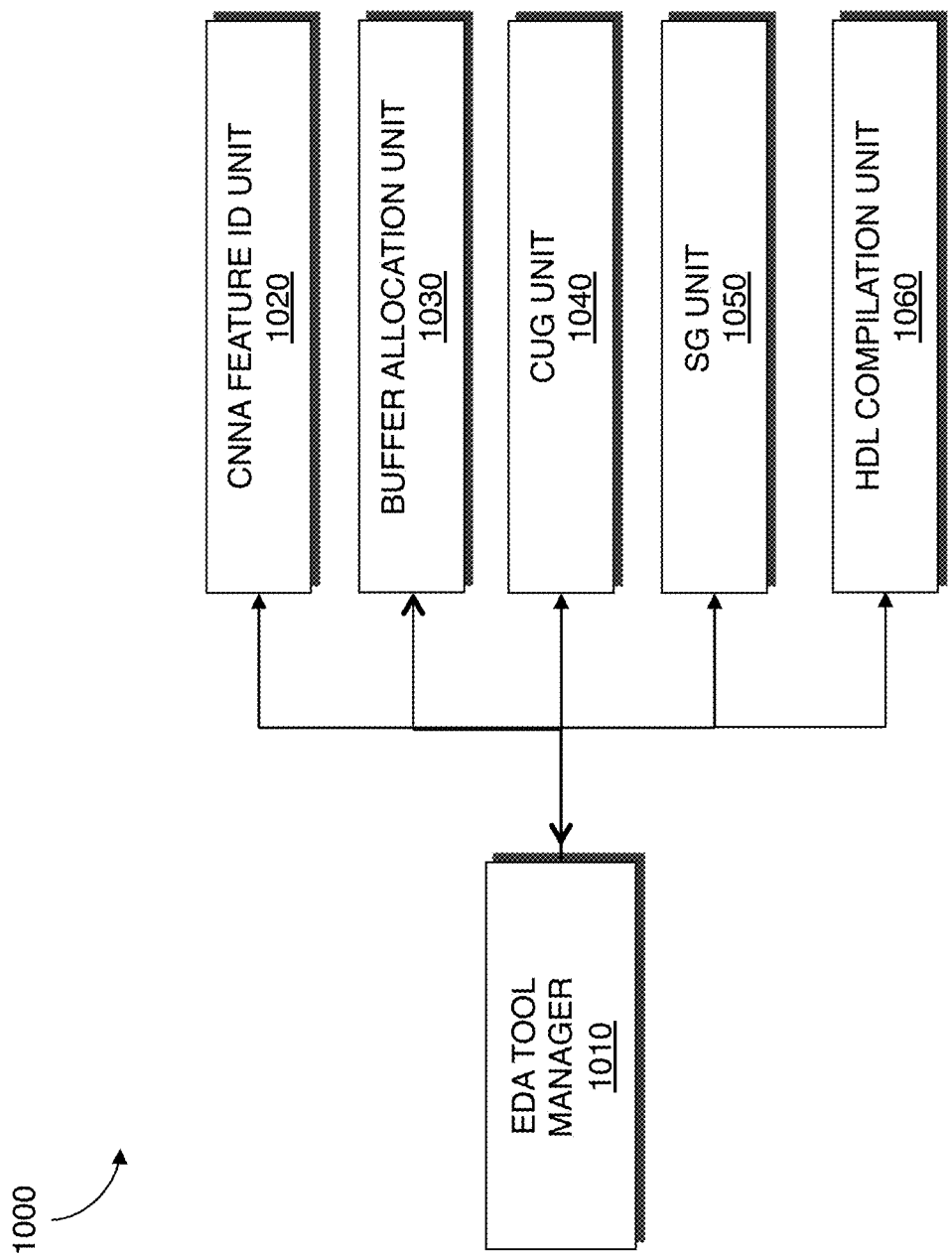
FIG. 10 is a block diagram of an electronic design automation tool according to an exemplary embodiment of the present invention.

FIG. 10 illustrates an EDA tool 1000 according to an embodiment of the present invention. The EDA tool 1000 may be used to implement the EDA tool 921 illustrated in FIG. 9. The EDA tool 1000 may be used for designing a system such as a CNN accelerator on one or more target devices such as an FPGA, ASIC, structured ASIC, or other circuitry. FIG. 10 illustrates modules implementing an embodiment of the EDA tool 1000. According to one embodiment, the modules represent software modules and designing a CNN accelerator may be performed by a computer system such as the one illustrated in FIG. 9 executing sequences of instructions represented by the modules shown in FIG. 10. Execution of the sequences of instructions causes the computer system to support system design as will be described hereafter. In alternate embodiments, hard-wire circuitry may be used in place of or in combination with software instructions to implement embodiments of present invention. Thus, embodiments of present invention are not limited to any specific combination of hardware circuitry and software.

The EDA tool 1000 includes an EDA tool manager 1010. The EDA tool manager 1010 is connected to and transmits data between the other components of the EDA tool 1000. The EDA tool manager 1010 provides an interface that allows a user such as a designer to input data into the EDA tool 1000.

The EDA tool 1000 includes a CNN accelerator feature identification unit 1020. According to an embodiment of the present invention, the CNN accelerator feature identification unit 1020 identifies characteristics of the CNN accelerator by identifying characteristics of one or more CNN algorithms that the CNN accelerator is desired to support. The characteristics of a CNN algorithm may include a number and sequence of stages of layers, such as convolution and noise filtering layers. The noise filtering layers may include, for example, pooling, normalization, and ReLU layers. The characteristics of the CNN algorithm may also include sizes and coefficients of filters, and sizes and strides of images to be processed. The CNN feature identification unit 1020 also identifies parameters of the CNN accelerator by identifying parameters for the one or more CNN algorithms that the CNN accelerator is desired to support. The parameters of a CNN algorithm may include a number of kernels to instantiate for each layer identified, and a number of multiplications to execute for each cycle of a kernel, and other parameters. The CNN feature identification unit 1020 also identifies resources available on a target to implement the CNN accelerator. The resources available may include a number and type of memory blocks, DSP blocks, and other components and processing units on a target. According to an embodiment of the present invention where a plurality of CNN algorithms are desired to be executed on the CNN accelerator, a range or plurality of characteristics and parameters may be identified for the CNN accelerator.

The EDA tool 1000 includes a buffer allocation unit 1030. According to an embodiment of the present invention, the buffer allocation unit 1030 assigns buffers to the CNN accelerator at an appropriate size to support a size of images to be processed by the CNN accelerator.

The EDA tool 1000 includes a computation unit generation unit 1040. The computation unit generation unit 1040 generates computation units such as processing element arrays to support the CNN algorithms to be performed by the CNN accelerator. According to an embodiment of the present invention, the processing element arrays include kernels that perform convolution and noise filtering. The processing element arrays may be generated to optimize performance utilizing resources available on a target used to implement the CNN accelerator.

The EDA tool 1000 includes a sequencer generation unit 1050. The sequencer generation unit 1050 generates a sequencer unit that coordinates transmission of data to appropriate processing element arrays on the CNN accelerator at appropriate times in order to time multiplex computations on the processing element arrays.

According to an embodiment of the present invention, information from the buffer allocation unit 1030, computation unit generation unit 1040, and sequencer generation unit 1050 is used to generate a description of the design of the CNN accelerator. The description of the design may be in HDL format or other format.

The EDA tool 1000 includes an HDL compilation unit 1060. The HDL compilation unit 1060 compiles a description of the design for the CNN accelerator for the target. According to an embodiment of the present invention, compilation involves performing synthesis, placement, routing, and timing analysis procedures on the HDL description of the design. The compiled design for the CNN accelerator may support a range of CNN variants. It should be appreciated that the EDA tool 1000 may perform the procedures described with reference to FIGS. 1-4.

Figure 11:
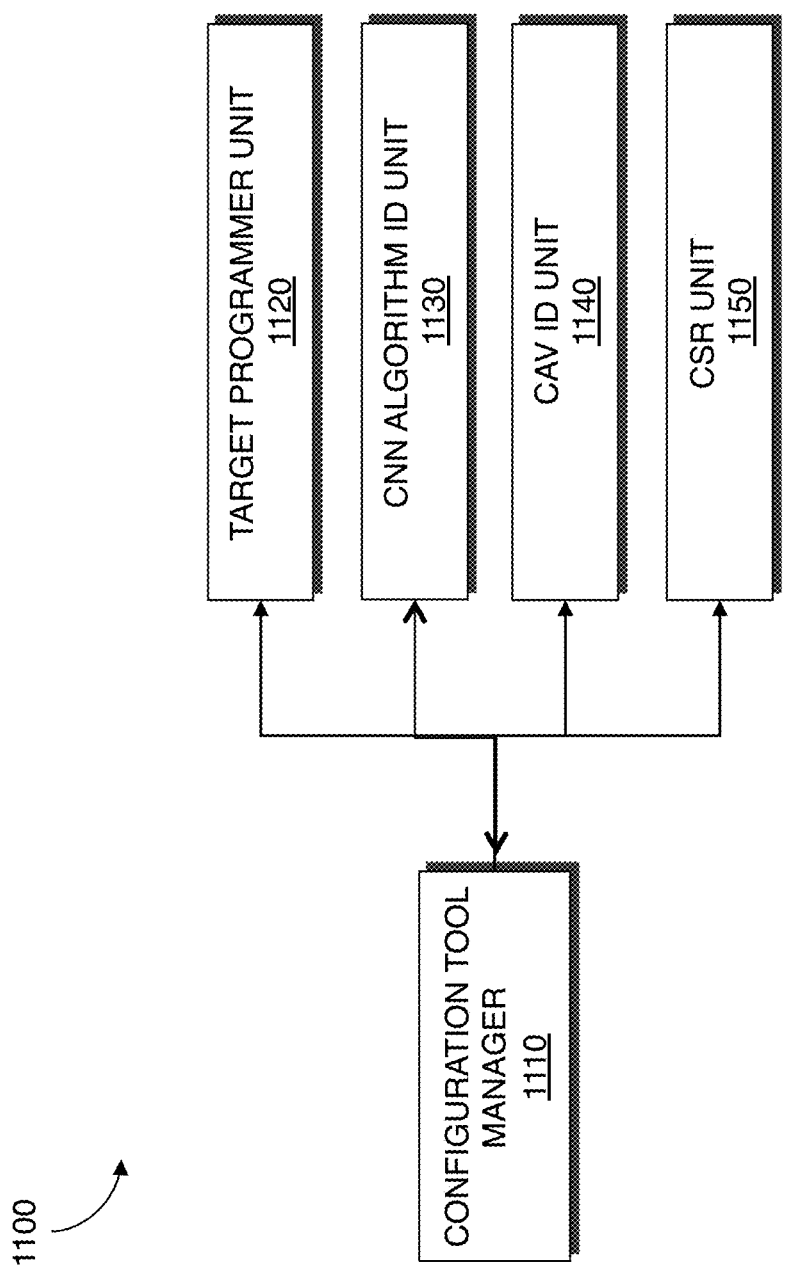
FIG. 11 illustrates a block diagram of a CNN accelerator configuration tool according to an exemplary embodiment of the present invention.

FIG. 11 illustrates a CNN accelerator configuration tool 1100 according to an embodiment of the present invention. The CNN accelerator configuration tool 1100 may be used to implement the configuration tool 922 illustrated in FIG. 9. The CNN accelerator configuration tool 1100 may be used to configure a system such as a CNN accelerator on one or more target devices such as an FPGA, ASIC, structured ASIC, or other circuitry. FIG. 11 illustrates modules implementing an embodiment of the CNN accelerator configuration tool 1100. According to one embodiment, the modules represent software modules and configuring a CNN accelerator may be performed by a computer system such as the one illustrated in FIG. 9 executing sequences of instructions represented by the modules shown in FIG. 11. Execution of the sequences of instructions causes the computer system to support configuration of a CNN accelerator as will be described hereafter. In alternate embodiments, hard-wire circuitry may be used in place of or in combination with software instructions to implement embodiments of present invention. Thus, embodiments of present invention are not limited to any specific combination of hardware circuitry and software.

The CNN accelerator configuration tool 1100 includes a configuration tool manager 1110. The configuration tool manager 1110 is connected to and transmits data between the other components of the configuration tool manager 1100. The configuration tool manager 1110 provides an interface that allows a user to input data into the configuration tool 1100.

The CNN accelerator configuration tool 1100 includes a target programmer unit 1120. The target programmer unit 1120 programs the target to implement a CNN accelerator. According to an embodiment of the present invention, programming the target involves programming one or more target devices with a configuration file that physically transforms the one or more target devices into the design of the CNN accelerator.

The CNN accelerator configuration tool 1100 includes a CNN algorithm identification unit 1130. The CNN algorithm identification unit 1130 identifies a CNN algorithm to be executed by the CNN accelerator. According to an embodiment of the present invention, the CNN algorithm to be executed may be identified from user input or from another source.

The CNN accelerator configuration tool 1100 includes a CNN accelerator variation identification unit 1140. The CNN accelerator variation identification unit 1140 identifies an appropriate variation of the CNN accelerator that supports the CNN algorithm to be executed. According to an embodiment of the present invention, the appropriate variation of the CNN accelerator may be identified from user input or from another source.

The CNN accelerator configuration tool 1100 includes a configurable status register unit 1150. The configurable status register unit 1150 sets one or more configurable status registers to support the variation of the CNN accelerator identified. According to an embodiment of the present invention, setting a configurable status register may add or subtract a convolution layer on the CNN accelerator, set a filter coefficient, remove one or more pooling layers, or reduce a size of a filter.

It should be appreciated that the CNN algorithm identification unit 1130 may make a determination as to whether a new CNN algorithm is to be executed by the CNN accelerator. If a determination is made that a new CNN algorithm is to be executed by the CNN accelerator, an appropriate CNN accelerator variation may be identified by configuration accelerator variation identification unit 1140, and configurable status registers may be set by the configurable status register unit 1150 to support the CNN accelerator variation. It should be appreciated that the CNN accelerator configuration tool 1100 may perform the procedures described with reference to FIG. 5.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 12:
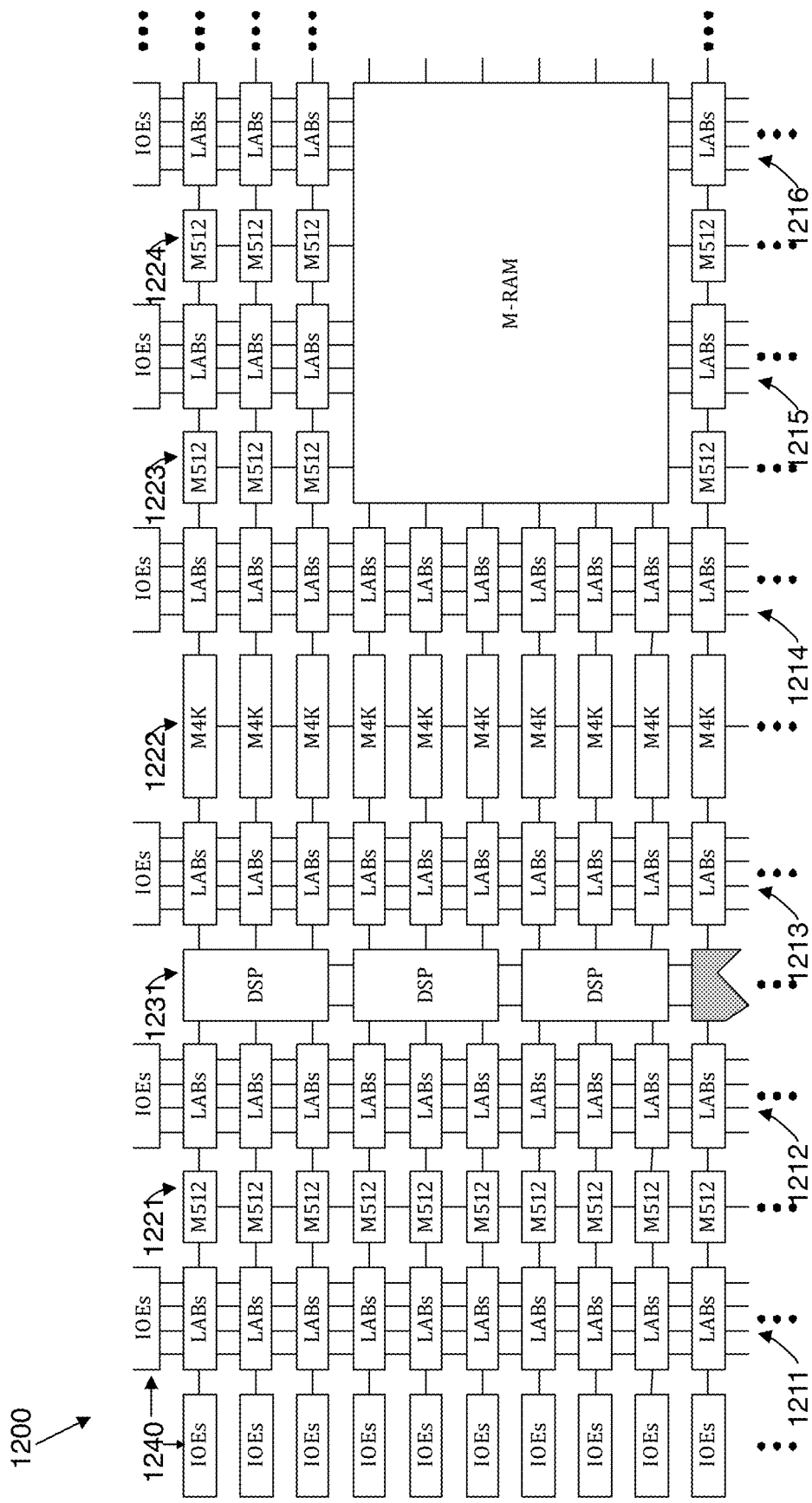
FIG. 12 illustrates an exemplary target device according to an embodiment of the present invention.

FIG. 12 illustrates a device 1200 that may be used to implement a target device according to an embodiment of the present invention. The device 1200 is a field programmable gate array (FPGA) that includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix devices manufactured by Altera Corporation. LABs are grouped into rows and columns across the device 1200. Columns of LABs are shown as 1211-1216. It should be appreciated that the logic block may include additional or alternate components.

The device 1200 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 1200. Columns of memory blocks are shown as 1221-1224. According to an embodiment of the present invention, CSRs may be implemented by one or more of the memory blocks in columns 1221-1224. The CSRs may be used to provide status to kernels in order to configure a CNN accelerator according to desired features of a CNN. This allows a CNN accelerator implemented by the target device 1200 to be configured during runtime.

The device 1200 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 1200 and are shown as 1231.

The device 1200 includes a plurality of input/output elements (IOEs) 1240. Each IOE feeds an IO pin (not shown) on the device 1200. The IOEs 1240 are located at the end of LAB rows and columns around the periphery of the device 1200. Each IOE may include a bidirectional IO buffer and a plurality of registers for registering input, output, and output-enable signals.

The device 1200 may include routing resources such as LAB local interconnect lines, row interconnect lines ("H-type wires"), and column interconnect lines ("V-type wires") (not shown) to route signals between components on the target device.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for implementing a convolutional neural network (CNN) accelerator on a target, comprising:
    identifying characteristics and parameters for the CNN accelerator;
    identifying resources on the target;
    generating a design for the CNN accelerator in response to the characteristics and parameters of the CNN accelerator and the resources on the target;
    identifying a CNN algorithm to execute on the CNN accelerator;
    identifying a variation of the CNN accelerator that supports execution of the CNN algorithm; and setting configurable status registers on the target at runtime, after the CNN accelerator is programmed on the target, to support the variation of the CNN accelerator, wherein setting the configurable status registers at runtime adds or subtracts a convolution layer used by the CNN accelerator or removes one or more noise filtering layers used by the CNN accelerator.

2. The method of claim 1, wherein identifying characteristics and parameters for the CNN accelerator comprises receiving the characteristics from a user.

3. The method of claim 2, wherein the characteristics for the CNN accelerator comprise:
a number and sequence of stages of layers;
sizes and coefficients of filters; and
sizes, strides, and padding of images.

4. The method of claim 1, wherein the characteristics for the CNN accelerator comprise a range of characteristics that allows the CNN accelerator to execute a plurality of CNN algorithms.

5. The method of claim 4, wherein generating the design for the CNN accelerator comprises implementing the configurable status registers (CSR), programmable by a user at runtime, to configure the target to support characteristics required for executing one of the plurality of CNN algorithms.

6. The method of claim 1, wherein generating the design for the CNN accelerator comprises assigning sizes for buffers to support sizes of images to be processed by the CNN accelerator.

7. The method of claim 1, wherein generating the design for the CNN accelerator comprises generating computation units in response to available resources on the target.

8. The method of claim 7, wherein generating the computation units comprises generating processing elements utilizing digital signal processor blocks, memory blocks, and adders on the target.

9. The method of claim 1, wherein generating the design for the CNN accelerator comprises generating a sequencer unit that coordinates transmission of data to processing element arrays on the CNN accelerator in order to time multiplex computations on the processing element arrays.

10. A method for implementing a convolutional neural network (CNN) accelerator on a target, comprising:
identifying a CNN algorithm to execute on the CNN accelerator;
identifying a variation of the CNN accelerator that supports execution of the CNN algorithm; and
setting configurable status registers on the target at runtime, after the CNN accelerator is programmed on the target, to support the variation of the CNN accelerator, wherein setting the configurable status registers at runtime adds or subtracts a number of convolution layers used by the CNN accelerator or removes one or more noise filtering layers used by the CNN accelerator.

11. The method of claim 10 further comprising:
determining whether a different CNN algorithm is to be executed on the CNN accelerator;
identifying a different variation of the CNN accelerator that supports execution of the different CNN algorithm; and
setting the configurable status registers on the target to support the different variation of the CNN accelerator.

12. The method of claim 10, wherein setting the configurable status registers adds or subtracts the number of the convolution layers used by the CNN accelerator.

13. The method of claim 10, wherein setting the configurable status registers sets filter coefficients.

14. The method of claim 10, wherein setting the configurable status registers removes one or more pooling layers.

15. The method of claim 10, wherein setting the configurable status registers reduces a size of a filter.

16. The method of claim 10 further comprising programming the target to implement the CNN accelerator with a configuration file.

17. A non-transitory computer readable medium including a sequence of instructions stored thereon for causing a computer to execute a method for implementing a convolutional neural network (CNN) accelerator on a target, comprising:
identifying characteristics and parameters for the CNN accelerator;
identifying resources on the target;
generating a design for the CNN accelerator in response to the characteristics and parameters of the CNN accelerator and the resources on target;
identifying a CNN algorithm to execute on the CNN accelerator;
identifying a variation of the CNN accelerator that supports execution of the CNN algorithm; and
setting configurable status registers on the target at runtime, after the CNN accelerator is programmed on the target, to support the variation of the CNN accelerator, wherein setting the configurable status registers at runtime adds or subtracts a number of convolution layers used by the CNN accelerator or removes one or more noise filtering layers used by the CNN accelerator.

18. The non-transitory computer readable medium of claim 17, wherein the characteristics for the CNN accelerator comprise a range of characteristics that allows the CNN accelerator to execute a plurality of CNN algorithms.

19. The non-transitory computer readable medium of claim 18, wherein generating the design for the CNN accelerator comprises implementing the configurable status registers (CSR), programmable by a user at runtime, to configure the target to support characteristics required for executing one of the plurality of CNN algorithms.

* * * * *